(12) United States Patent
de Heer

(10) Patent No.: US 8,082,179 B2
(45) Date of Patent: Dec. 20, 2011

(54) MONITORING TELEVISION CONTENT INTERACTION TO IMPROVE ONLINE ADVERTISEMENT SELECTION

(75) Inventor: David L de Heer, Woodside, CA (US)

(73) Assignee: Microsoft Corporation, Redmond, WA (US)

( * ) Notice: Subject to any disclaimer, the term of this patent is extended or adjusted under 35 U.S.C. 154(b) by 541 days.

(21) Appl. No.: 11/934,074

(22) Filed: Nov. 1, 2007

(65) Prior Publication Data

US 2009/0119151 A1 May 7, 2009

(51) Int. Cl.
*G06F 17/00* (2006.01)
(52) U.S. Cl. ........................................ 705/14.73; 725/34
(58) Field of Classification Search ............... 705/14.73; 725/34
See application file for complete search history.

(56) References Cited

U.S. PATENT DOCUMENTS

| | | | | |
|---|---|---|---|---|
| 4,949,187 | A * | 8/1990 | Cohen | 386/234 |
| 5,038,211 | A | 8/1991 | Hallenbeck | |
| 5,227,874 | A * | 7/1993 | Von Kohorn | 705/10 |
| 5,371,551 | A * | 12/1994 | Logan et al. | 348/571 |
| 5,973,683 | A | 10/1999 | Cragun | |
| 6,233,389 | B1 * | 5/2001 | Barton et al. | 386/232 |
| 6,545,722 | B1 | 4/2003 | Schultheiss | |
| 6,553,178 | B2 | 4/2003 | Abecassis | |
| 6,757,707 | B1 | 6/2004 | Houghton | |
| 7,065,709 | B2 | 6/2006 | Ellis | |
| 2001/0049620 | A1 * | 12/2001 | Blasko | 705/10 |
| 2002/0059094 | A1 | 5/2002 | Hosea et al. | |
| 2002/0123928 | A1 * | 9/2002 | Eldering et al. | 705/14 |
| 2003/0033157 | A1 | 2/2003 | Dempski et al. | |
| 2003/0074661 | A1 | 4/2003 | Krapf et al. | |
| 2006/0253323 | A1 | 11/2006 | Phan | |
| 2007/0283384 | A1 | 12/2007 | Haeuser | |
| 2008/0259906 | A1 * | 10/2008 | Shkedi | 370/352 |
| 2009/0186704 | A1 * | 7/2009 | Goldberg et al. | 463/42 |

FOREIGN PATENT DOCUMENTS

KR 20000050255 8/2000

OTHER PUBLICATIONS

"Advertising.com Enhances AdLearn Optimization Technology", http://www.advertising.com/press_room_article.php?id=196&ofs=0.
"Visible World and Tremor Media Partner for Targeted Online Ads", http://clickz.com/showPage.html?page=3626018.
"Interactive Advertising and Children: Issues and Implications", http://www.childrennow.org/assets/pdf/issues_media_dtv_brief1.pdf, 2005, 3 pages.
"PCT Search Report and Written Opinion", Application No. PCT/US2008/081282, (May 8, 2009), 11 pages.

* cited by examiner

Primary Examiner — Thomas Dixon

(57) ABSTRACT

Online advertisement selection techniques are described. In an implementation, data is obtained which describes interaction of one or more clients with television content. At least one online advertisement is selected to be output in conjunction with online content based on the interaction with the television content described in the obtained data.

16 Claims, 4 Drawing Sheets

MONITORING TELEVISION CONTENT INTERACTION TO IMPROVE ONLINE ADVERTISEMENT SELECTION

BACKGROUND

Advertising continues to be one of the major driving factors used to generate revenue by content providers and network operators. In traditional television advertising models, advertisements were embedded in content, such as television programs, which were then broadcast "over the air" to consumers such that the consumers were able to consume the content. Thus, in this traditional model revenue collected from advertisers was used to support the provision of the content to users.

Further, advertising models were extended as the different types of content were extended. For instance, online content (e.g., web pages and so on) may be configured to include a variety of advertisements, such as banner advertisements, pop-up ads, and so on. Thus, a viewer of a web page may also view advertisements to support provision of the web page. These different advertising models, however, were often provided separately and therefore did not leverage knowledge gained in one advertising model for another advertising model.

SUMMARY

Online advertisement selection techniques are described. In an implementation, data is obtained which describes interaction of one or more clients with television content. At least one online advertisement is selected to be output in conjunction with online content based on the interaction with the television content described in the obtained data.

In another implementation one or more computer-readable media include instructions that are executable to select online advertisements to be output at a particular household in conjunction with one or more web pages based on monitored interaction with television content at the particular household.

In a further implementation, one or more computer-readable media include instructions that are executable to select at least one advertisement to be output with content that is not television content (e.g., radio web pages, and so on) based on monitored interaction with advertisements embedded in television content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
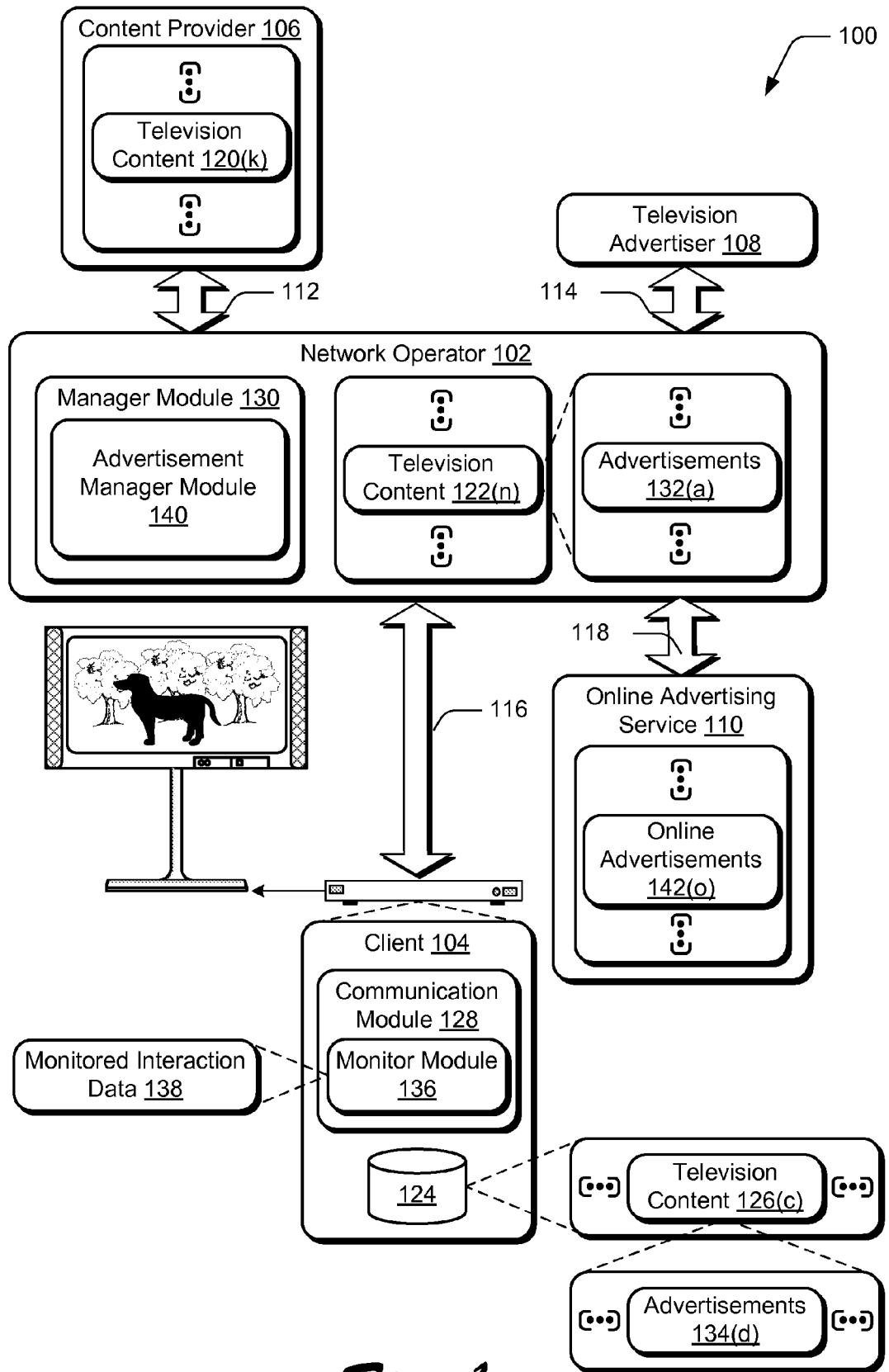
FIG. 1 is an illustration of an environment in an exemplary implementation that is operable to employ techniques to select online advertisements.

The range of content this is made available to users is ever increasing, e.g., from traditional television content to online content such as web pages, music downloads, and so on. The range of advertising techniques to support provision of this content is also ever increasing. For example, traditional television content may include embedded advertisements to support provision of the content. Online content may also employ advertising to support provision of the online content, such as banner advertisements, pop-up ads, and so on. However, these different advertising techniques (e.g., embedding advertisements in television content, banner advertisement on a webpage, and so on) were provided separately and did not leverage knowledge that may be gained by one advertising technique to improve an experience with another advertising technique.

Techniques to select online advertisements are described. In an implementation, television content interaction is monitored, such as to determine which television programs and advertisements are watched by a user, "how" the television programs and advertisements are watched (e.g., normal output versus fast forwarding), and so on. This monitored interaction may then be used to select an online advertisement for output in conjunction with online content, such as to place a banner advertisement on a web page.

For example, a network operator may provide Internet access and television content to a particular household, such as via a digital subscriber line (DSL). Because of this, the network operator may be made aware as to what television content is output at the particular household. Therefore, when a request is made to access the Internet, advertisements may be selected for inclusion on web pages that relate to the television content viewed at the household. For instance, a user may watch a television program having a car commercial. When the user accesses the Internet via a portal page, the portal page may contain a pop-up advertisement that relates to the car commercial, e.g., the car commercial in the television program and the pop-up advertisement may have a matching (i.e., the same) advertiser, in this case a car company. Thus, a consistent experience may be provided "across" the television and online experience, further increasing the effectiveness of the advertisements and consequently revenue opportunities to providers of the content as well as the advertisers. Further discussion of online advertisement selection may be found in relation to the following figures.

In the following discussion, an exemplary environment is first described that is operable to employ techniques to select online advertisements. Exemplary procedures are then described that may be employed in the exemplary environment, as well as in other environments. Although these techniques are described as employed within a television and online environment in the following discussion, it should be readily apparent that these techniques may be incorporated within a variety of environments without departing from the spirit and scope thereof. For example, content interaction with a mobile phone may also be leveraged to select advertisements to be output in conjunction with other content that is not output on the mobile phone.

Exemplary Environment

FIG. 1 is an illustration of an environment 100 in an exemplary implementation that is operable to employ techniques to select online advertisements. The illustrated environment 100 includes a network operator 102 (e.g., a "head end"), a client 104, a content provider 106, a television advertiser 108 and an online advertising service 110 that are communicatively coupled, one to another, via network connections 112, 114, 116, 118. In the following discussion, the network operator 102, the client 104, the content provider 106, the television advertiser 108 and the online advertising service 110 may be representative of one or more entities, and therefore reference may be made to a single entity (e.g., the client 104) or multiple entities (e.g., the clients 104, the plurality of clients 104, and so on). Additionally, although a plurality of network connections 112-118 are shown separately, the network connections 112-118 may be representative of network connections achieved using a single network or multiple networks. For example, network connection 116 may be representative of a broadcast network with back channel communication, an Internet Protocol (IP) network, and so on.

The client 104 may be configured in a variety of ways. For example, the client 104 may be configured as a computer that is capable of communicating over the network connection 116, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine (e.g., a client device).

The content provider 106 includes one or more items of television content 120(k), where "k" may be an integer from 1 to "K". The television content 120(k) may include a variety of content, such as television programming, video-on-demand (VOD) files, and so on. The television content 120(k) is communicated over the network connection 112 to the network operator 102.

Television content 120(k) communicated via the network connection 112 is received by the network operator 102 and may be stored as one or more items of television content 122(n), where "n" may be an integer from "1" to "N". The television content 122(n) may be the same as or different from the television content 120(k) received from the content provider 106. The television content 122(n), for instance, may include additional data for broadcast to the client 104, such as electronic program guide (EPG) data.

The client 104, as previously stated, may be configured in a variety of ways to receive the television content 122(n) over the network connection 114. The client 104 typically includes hardware and software to transport and decrypt television content 122(n) received from the network operator 102 for rendering by the illustrated display device. Although a display device is shown, a variety of other output devices are also contemplated, such as speakers.

The client 104 may also include digital video recorder (DVR) functionality. For instance, the client 104 may include a storage device 124 to record television content 122(n) as television content 126(c) (where "c" may be an integer from one to "C") received via the network connection 116 for output to and rendering by the display device. The storage device 124 may be configured in a variety of ways, such as a hard disk drive, a removable computer-readable medium (e.g., a writable digital video disc), and other types of computer-readable media. Thus, television content 126(c) that is stored in the storage device 124 of the client 104 may be copies of the television content 122(n) that was streamed from the network operator 102. Additionally, television content 126(c) may be obtained from a variety of other sources, such as from a computer-readable medium that is accessed by the client 104, and so on.

The client 104 includes a communication module 128 that is executable on the client 104 to control content playback on the client 104, such as through the use of one or more "command modes". The command modes may provide time-shifting techniques that may be applied to an output of the television content 126(c) (i.e., non-linear playback of the television content 126(c)) such as pause, rewind, fast forward, slow motion playback, and the like.

The network operator 102 is illustrated as including a manager module 130. The manager module 130 is representative of functionality to configure television content 122(n) for output (e.g., streaming) over the network connection 116 to the client 104. The manager module 130, for instance, may configure television content 120(k) received from the content provider 106 to be suitable for transmission over the network connection 114, such as to "packetize" the content for distribution over an Internet Protocol (IP) network (e.g., the Internet), configuration for a particular broadcast channel, map the television content 120(k) to particular channels, and so on.

Thus, in the environment 100 of FIG. 1, the content provider 106 may broadcast the television content 120(k) over a network connection 112 to a multiplicity of network operators, an example of which is illustrated as network operator 102. The network operator 102 may then stream the television content 122(n) over a network connection to a multitude of clients, an example of which is illustrated as client 104. The client 104 may then store the television content 122(n) in the storage device 124 as television content 126(c), such as when the client 104 is configured to include digital video recorder (DVR) functionality.

The television content 122(n) may also be representative of time-shifted content, such as video-on-demand (VOD) content that is streamed to the client 104 when requested, such as movies, sporting events, and so on. For example, the network operator 102 may execute the manager module 130 to provide a VOD system such that the content provider 106 supplies television content 120(k) in the form of complete content files to the network operator 102. The network operator 102 may then store the television content 120(k) as television content 122(n). The client 104 may then request playback of desired television content 122(n) by contacting the network operator 102 (e.g., a VOD server) and requesting a feed (e.g., stream) of the desired content.

In another example, the television content 122(n) may further be representative of content (e.g., television content 120(k)) that was recorded by the network operator 102 in response to a request from the client 104, in what may be referred to as a network DVR example. Like VOD, the recorded television content 122(n) may then be streamed to the client 104 when requested. Interaction with the television content 122(n) by the client 104 may be similar to interaction that may be performed when the television content 126(c) is stored locally in the storage device 124.

To collect revenue using a traditional advertising model, the content provider 106 may embed advertisements in the television content 120(k). Likewise, the network operator 102 may also embed advertisements obtained from the television advertiser 108 in the television content 122(n) to also collect revenue using the traditional advertising model. For example, the content provider 106 may correspond to a "national"

television broadcaster and therefore offer the television content 120(k) and national advertising opportunities to advertisers, which are then embedded in the television content 120(k). The network operator 102, on the other hand, may correspond to a "local" television broadcaster and offer the television content 122(n) with the advertisements embedded by the content provider 106 as well as advertisements obtained from local advertisers to the client 104. Thus, the advertisements 130(d) which are embedded in the television content 126(c) streamed to the client 104 may be provided from a variety of sources. Consequently, the one or more advertisements 134(d) embedded in the television content 126(c) at the client 104 may also originate from a wide variety of sources. Although national and local examples were described, a wide variety of other examples are also contemplated.

The communication module 128 of the client is also illustrated as including a monitor module 136. The monitor module 136 is representative of functionality to monitor interaction of the client 104 with television content 122(n) and advertisements 132(a) provided directly from the network operator 102 and/or indirectly from the network operator 102, such as television content 126(c) and advertisements 134(d). Data may be generated by the monitor module 136 that describes this monitored interaction, which is illustrated as monitored interaction data 138 in FIG. 1.

The manager module 130 is also illustrated as including an advertisement manager module 140, which is representative of functionality to leverage the monitored interaction data 138 to select one or more online advertisements 142(o), where "o" may be an integer between one and "O". For example, the advertisement manager module 140 may determine which television content 122(n) and/or television content 126(c) was output by the client 104. Using this information, the advertisement manager module 140 may make an "informed" decision as to which of the one or more online advertisements 142(o) is to be output in conjunction with online content.

For example, the network operator 102 may provide access to television content 122(n) as well as Internet access to obtain online content, such as web pages. The network operator 102 may leverage knowledge gained by analysis of the monitored interaction data 138 to provide advertisements on a portal webpage that is initially output at the client 104 when accessing the Internet. Thus, the advertisements output during online access are "tied" to the television content, such as to subject matter of the television content, which advertisements 132(a) were output, and so on. Although the advertisement manager module 140 is illustrated as being employed by the network operator, however, it should be readily apparent that the functionality of the advertisement manager module 140 may be employed by a variety of entities, such as by the online advertising service 110, an example of which is illustrated and discussed in relation to the following figure.

Figure 2:
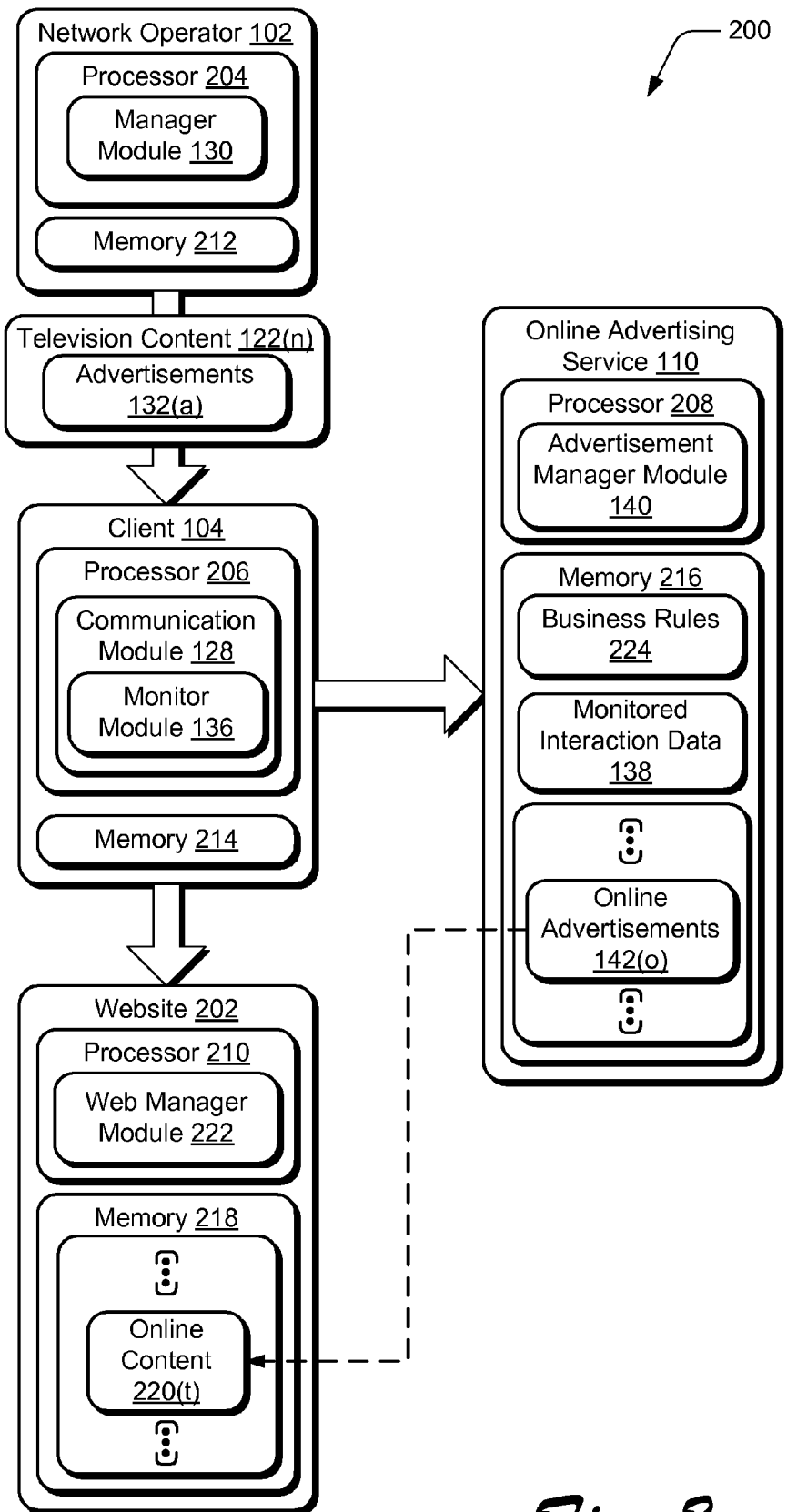
FIG. 2 is an illustration of a system in an exemplary implementation showing a network operator, a client and an online advertising service in greater detail in conjunction with a website.

FIG. 2 depicts a system 200 in an exemplary implementation showing the network operator 102, the client 104 and the online advertising service 110 in greater detail in conjunction with a website 202. The network operator 102, the client 104, the online advertising service 110 and the website 202 are depicted as being implemented by one or more devices (e.g., the client 104 is illustrated as a client device) having respective processors 204, 206, 208, 210 and memory 212, 216, 216 and 218.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 212, 216, 216 and 218 is shown, respectively, for the devices, a wide variety of types and combinations of memory may be employed, such as random access memory (RAM), hard disk memory, removable medium memory, and other types of computer-readable media.

The network operator 102 is illustrated as executing the manager module 130 on the processor 204, which is storable in memory, to broadcast television content 122(n) having embedded advertisements 132(a) over an IP network (depicted via an arrow) to the client 104.

The client 104 is illustrated as executing a communication module 128 having a monitor module 136 on the processor 206, which are storable in memory 214. As previously described, the communication module 128 is representative of functionality to output the television content 122(n) (and the embedded advertisements 132(a)), such as for rendering by a display device having speakers.

The monitor module 136 is representative of functionality to monitor interaction of the client 104 with the television content 122(n), e.g., in real time as the television content 122(n) is broadcast by the network operator 102, during time-shifted output from the storage device 124 of FIG. 1, from a computer-readable medium (e.g., a digital video disc), and so on. In the illustrated system 200 of FIG. 2, the monitored interaction data 138 is communicated to the online advertising service 110 and stored in memory 216. As previously described, the monitored interaction data 138 may be leveraged to coordinate the online advertisements 142(o) that are output with online content with the television content 122(n) output at the client 104.

As an example, the client 104 may access the website 202 (e.g., through another network operator, the network operator 102 that provided the television content 122(n), and so on) to request online content 220(t), where "t" may be an integer between one and "T". The website 202 is illustrated as being implemented by a web manager module 222 that is representative of functionality to manage provision of the online content 220(t).

The web manager module 222 may redirect the client 104 to the online advertising service 110 to obtain online advertisements 142(o) to be output in conjunction with the online content 220(t), which is illustrated in FIG. 2 through the use of a dashed line.

The online advertising service 110 is illustrated as executing the advertisement manager module 140 on the processor 208, which is storable in memory 216. The advertisement manager module 140, when executed, may determine an identity of the client 104, such as by examining one or more "cookies" stored in memory 214 of the client 104, identifying an IP address used by the client 104 to access the online advertising service 110, and so on. This identification may then be used to locate the monitored interaction data 138 that corresponds to the client 104.

The advertisement manager module 140 may then select one or more of the online advertisements 142(o) to be output in conjunction with the online content 220(t) and may also address business rules 224. The online advertisements 142(o), for instance, may indicate that the client 104 has output a significant number of car advertisements and even that a large portion of these advertisements correspond to a particular car manufacturer. To increase the effectiveness of the television advertisements as well as the online advertisements, the advertisement manager module 140 may select online advertisements 142(*o*) of the particular car manufacturer for output.

In an instance that such an online advertisement is not available, similar advertisements may be selected using the business rules 224. For example, an online advertiser may have purchase guarantees for a certain number of impressions. Thus, the online advertising service 110 may leverage the monitored interaction data 138 along with other business rules 224 to coordinate online advertisements 142(*o*) output in conjunction with online content 220(*t*) with television content 122(*n*) and advertisements 132(*a*) that are embedded in the television content 122(*n*). A variety of other examples are also contemplated, further discussion of which may be found in relation to the following exemplary procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the described techniques are platform-independent, meaning that the techniques may be implemented on a variety of commercial computing platforms having a variety of processors.

Exemplary Procedures

The following discussion describes techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
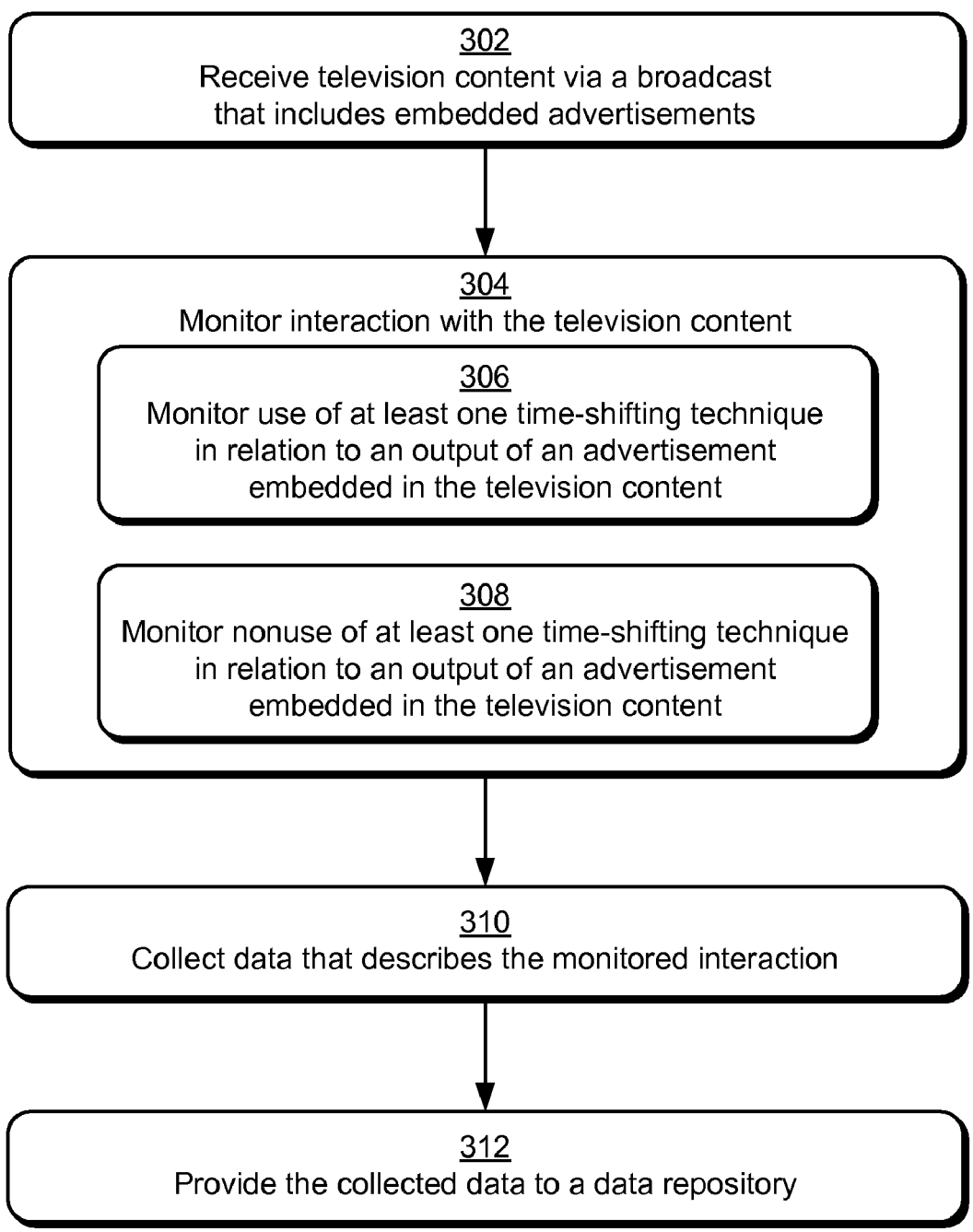
FIG. 3 is a flow diagram depicting a procedure in an exemplary implementation in which data is collected that describes monitored interaction of a client with television content.

FIG. 3 depicts a procedure 300 in an exemplary implementation in which data is collected that describes monitored interaction of a client with television content. Television content is received via a broadcast that includes embedded advertisements (block 302). The television content 122(*n*), for instance, may be broadcast by the network operator 102 via an IP network (e.g., the Internet) to the client 104 using a digital subscriber line. A variety of other instances are also contemplated, such as through use of a traditional "over-the-air" broadcast, via a cable (e.g., digital cable) connection, satellite, and so on.

Interaction with the television content is monitored (block 304), which may be performed in a variety of ways. As an example, "which" television content 122(*n*), 126(*c*) was output by the client 104 may be monitored, e.g., via periods of time that particular broadcast channels were watched, through identifiers of particular television content 122(*n*) and/or advertisements 132(*a*), and so on.

As another example, "how" the interaction was performed may also be monitored. For instance, use of at least one time-shifting technique in relation to an output of an advertisements embedded in the television content may be monitored (block 306), such as which advertisements 134(*d*) were "fast forwarded" when the television content 126(*c*) is output from the storage device 124 in a DVR example. Thus, in this instance a determination is made as to which of the advertisements 134(*d*) are not "liked" by the client 104.

In another instance, nonuse of at least one time-shifting technique in relation to an output of an advertisements embedded in the television content may be monitored (block 308). Continuing with the previous example, this instance may track which advertisements 134(*d*) were permitted output (e.g., not "fast forwarded") when the television content 126(*c*) is output from the storage device 124 in the DVR example and thus were "liked" by the client 104. Thus, use and/or nonuse of time-shifting techniques may be indicative of which advertisements have an increased likelihood of being of interest to the client 104. A variety of other instances are also contemplated.

Data that describes the monitored interaction is collected (block 310) and the collected data is provided to a data repository (block 312). For example, the monitor module 136 may collect the monitored interaction data 138 and periodically upload it to the online advertising service 110 to be stored in memory 216. Likewise, the online advertising service 110 may collect similar monitored interaction data from other clients to form a repository to provide increased "richness" when providing online advertisement 142(*o*) that address the television content 122(*n*) and/or advertisements 132(*a*) embedded in the television content 122(*n*), further discussion of which may be found in relation to the following procedure.

Figure 4:
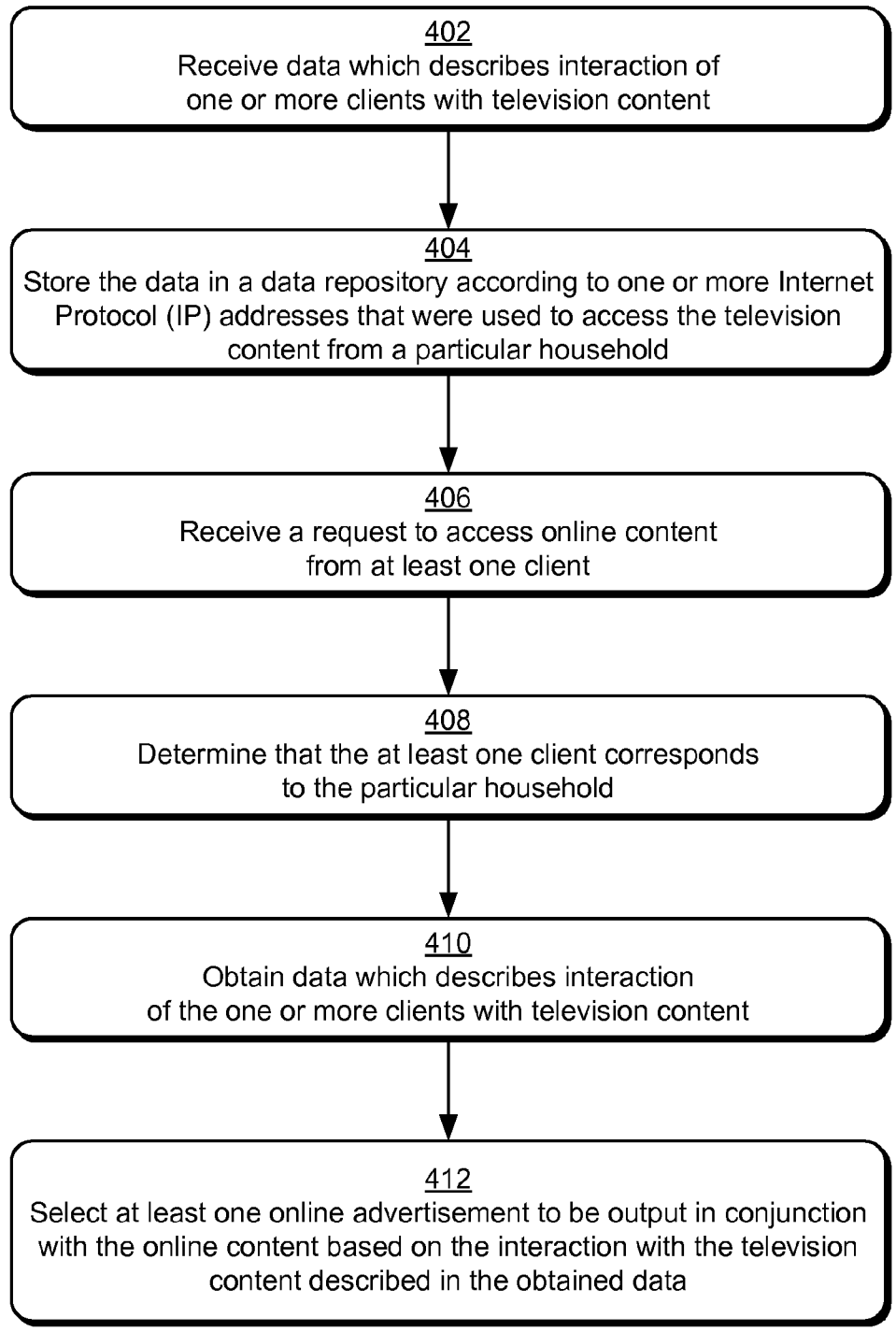
FIG. 4 is a flow diagram depicting a procedure in an exemplary implementation in which online advertisements are selected based on data that describes monitored interaction with television content as described in relation to FIG. 3.

FIG. 4 depicts a procedure 400 in an exemplary implementation in which online advertisements are selected based on the data that describes monitored interaction with television content as described in relation to FIG. 3. Data is received which describes interaction of one or more clients with television content (block 402). As previously described, this data may describe interaction in a variety of ways, such as through channel and time, specific identifiers of television content and/or advertisements, and so on.

The data is stored in a data repository according to one or more Internet Protocol (IP) addresses that were used to access the television content from a particular household (block 404). A variety of other examples are also contemplated, such as to store the data according to an identifier that is to be contained in a cookie on the client 104 for later retrieval by the online advertising service 110, and so on.

A request is received to access online content from at least one client (block 406). For example, a client configured as a set-top box (an example of which is illustrated in FIG. 1) in a particular household (e.g., a residence) may be used to receive television content 122(*n*) via a particular IP address. The particular IP address may be assigned to the client by the network operator, e.g., singly or as part of a range of IP addresses. A user at the particular household may then use a laptop computer to request online content, such as to access a website via the Internet.

A determination is made that the at least one client corresponds to the particular household (block 408). Continuing with the previous example, the laptop computer used to access the Internet may use an IP address assigned by the network operator 102 which may be the same IP address or another IP address in the range assigned to the particular household. The online advertising service 110 may therefore determine that the laptop is a part of the particular household.

Accordingly, data is obtained which describes interaction of the one or more clients with the television content (block 410), such as the data from the repository that corresponds to the particular household through the IP address and/or the range of IP addresses previously described.

At least one online advertisement to be output in conjunction with the online content is selected based on the interaction with the television content described in the obtained data (block 412). As an example, the online advertisement 142(*o*)

may be selected that has a corresponding advertiser that matches an advertiser of advertisements 132(*a*) embedded in the television content 122(*n*), such as a particular car manufacturer. In another example, online advertisements from a similar advertiser may be output, such as an online advertisement from another car manufacturer.

Selection of the online advertisements 142(*o*) may also be based on the use to time-shifting techniques. For example, online advertisements that have a matching and/or similar advertiser (e.g., same subject matter, different advertiser) to that of advertisements that were permitted output at the client 104 (e.g., a time-shifting technique such as fast forward was not used) may be selected as being "favored" by the client 104. Likewise "disfavored" advertisements 132(*a*) in the television content 122(*n*) that were time shifted (e.g., fast forwarded) may be used to prevent similar online advertisements 142(*o*) from being output. A variety of other examples are also contemplated to coordinate online advertisement 142(*o*) selection with advertisements 132(*a*) that are embedded in television content 122(*n*).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer-implemented method comprising:
   obtaining data which describes interaction of one or more clients, situated in a location associated with one or more Internet Protocol addresses, with one or more advertisements embedded in television content;
   storing the data in a data repository according to the one or more Internet Protocol addresses; and
   selecting at least one online advertisement to be output at the location in conjunction with online content based on the interaction with the television content described in the obtained data, the selected at least one online advertisement and the one or more advertisements embedded in the television content being for a same advertiser.

2. A method as described in claim 1, wherein the obtaining is performed in response to a request received from a client that is redirected from a website to an advertising service that performs the obtaining and the selecting.

3. A method as described in claim 1, wherein:
   the television content is provided by a network operator to the one or more clients; and
   the online content includes a web page output by the network operator.

4. A method as described in claim 1, wherein the one or more clients obtain access to the online content and the television content via a network operator.

5. A method as described in claim 4, wherein:
   the obtaining and the selecting at least one online advertisement are performed by an advertising service that is separate entity from the network operator; and
   the data is collected by the network operator, which is then provided to the advertising service.

6. A method as described in claim 1, wherein:
   the one or more clients include at least two said clients situated in a single household; and
   the single household is identified to perform the selecting using one or more Internet Protocol addresses.

7. A method as described in claim 1, wherein the television content and the online content are provided by a network operator via an Internet Protocol (IP) Network.

8. A method as described in claim 1, wherein the described interaction includes descriptions of at least one use of a time shifting technique, that is applied to an output of the television content.

9. A method as described in claim 1, wherein the described interaction includes descriptions of at least one nonuse of a time-shifting technique to an output of an advertisement embedded in the television content.

10. A method as described in claim 1, wherein the obtaining and the selecting are performed by an advertising service that obtains the data from a plurality of network operators that provide access to the television content and the online content to a plurality of said clients.

11. One or more computer-readable media devices comprising instructions that are executable to select online advertisements to be output at a particular location in conjunction with one or more web pages based on monitored interaction of one or more clients situated in the location with television content at the particular location, the monitored interaction including use of a time-shifting technique in relation to an output of the television content, wherein the particular location is identified via one or more Internet Protocol (IP) addresses that are used to access the television content and the one or more web pages.

12. One or more computer-readable media devices as described in claim 11, wherein:
   the monitored interaction is performed for a plurality of clients in the particular location; and
   the monitored interaction of at least one said client includes nonuse of a time-shifting technique in relation to the output of the television content.

13. One or more computer-readable media devices as described in claim 11, wherein the instructions are executable to select the online advertisements based on similarity to one or more advertisements embedded in the television content that were output at the particular location.

14. One or more computer-readable media devices comprising instructions that are executable to select at least one advertisement to be output with content that is not television content based on monitored interaction of one or more clients situated in a location with advertisements embedded in television content, the selected at least one advertisement and the advertisements embedded in the television content being for a matching advertiser, wherein the monitored interaction is represented by data stored in a data repository.

15. One or more computer-readable media devices as described in claim 14, wherein the content is online content and the at least one advertisement is an online advertisement.

16. One or more computer-readable media devices as described in claim 14, wherein the instructions are further executable to identify an association between an Internet Protocol (IP) address of a client that accesses the content with an IP address that corresponds to data that describes the monitored interaction with the advertisements embedded in the television content.

* * * * *